US011059445B2

(12) United States Patent
Malapati et al.

(10) Patent No.: US 11,059,445 B2
(45) Date of Patent: Jul. 13, 2021

(54) DEPLOYABLE PANEL FOR AN AIRBAG

(71) Applicant: Ford Global Technologies, LLC, Dearborn, MI (US)

(72) Inventors: Srinivas Reddy Malapati, Novi, MI (US); Mangesh Kadam, Canton, MI (US); Yuqin Zhao, Troy, MI (US); Leonard Anthony Shaner, New Baltimore, MI (US); Zhibing Deng, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 24 days.

(21) Appl. No.: 16/594,191

(22) Filed: Oct. 7, 2019

(65) Prior Publication Data

US 2021/0101553 A1 Apr. 8, 2021

(51) Int. Cl.
*B60R 21/205* (2011.01)
*B60R 21/215* (2011.01)
*B60R 21/232* (2011.01)
*B60R 21/16* (2006.01)

(52) U.S. Cl.
CPC .......... *B60R 21/205* (2013.01); *B60R 21/215* (2013.01); *B60R 21/232* (2013.01); *B60R 2021/161* (2013.01); *B60R 2021/21537* (2013.01)

(58) Field of Classification Search
CPC ... B60R 21/205; B60R 21/215; B60R 21/232; B60R 2021/161; B60R 2021/21537
See application file for complete search history.

(56) References Cited

U.S. PATENT DOCUMENTS

| 6,616,182 | B2 |  | 9/2003 | Woolley et al. |
|---|---|---|---|---|
| 6,893,045 | B2 | * | 5/2005 | Inoue .................. B60R 13/02 280/730.2 |
| 7,540,531 | B2 |  | 6/2009 | Sakakibara et al. |
| 8,077,396 | B2 |  | 12/2011 | Croy et al. |
| 8,465,049 | B2 | * | 6/2013 | Tsujimoto ............ B60R 21/205 280/729 |
| 8,801,031 | B1 | * | 8/2014 | Zucal .................. B60R 21/213 280/730.2 |
| 9,487,177 | B2 |  | 11/2016 | Schneider et al. |
| 10,077,020 | B2 |  | 9/2018 | Raikar et al. |
| 10,131,280 | B2 |  | 11/2018 | De Wind et al. |
| 10,507,783 | B2 | * | 12/2019 | Rupp .................... B60K 35/00 |
| 10,864,876 | B2 | * | 12/2020 | Malapati ............. B60R 21/205 |
| 2001/0033073 | A1 | * | 10/2001 | Hammond ............ B60R 21/06 280/730.2 |
| 2007/0132217 | A1 | * | 6/2007 | Seong .................. B60R 21/213 280/730.2 |
| 2008/0136144 | A1 |  | 6/2008 | Spahr et al. |

(Continued)

*Primary Examiner* — Drew J Brown
(74) *Attorney, Agent, or Firm* — Frank A. MacKenzie; Bejin Bieneman PLC

(57) ABSTRACT

An assembly includes an interior component. The assembly includes a deployable panel having an upper panel and a lower panel supported by the interior component, the deployable panel being movable relative to the interior component from a retracted position to an extended position. The assembly includes a hinge between the upper panel and the lower panel. The assembly includes an airbag inflatable to an inflated position in which the airbag is positioned to abut the upper panel in the extended position.

20 Claims, 8 Drawing Sheets

(56) References Cited

U.S. PATENT DOCUMENTS

2016/0096491 A1* 4/2016 Sitko ................... B60R 13/0275
                                                        280/730.2
2020/0172039 A1* 6/2020 Ghannam ........... B60R 21/2035

* cited by examiner

DEPLOYABLE PANEL FOR AN AIRBAG

BACKGROUND

A vehicle may include one or more airbags inflatable during a vehicle impact to control kinematics of occupants inside the vehicle. The airbag may be a component of an airbag assembly including a housing supporting the airbag. The airbag assembly includes an inflation device in communication with the airbag for inflating the airbag from an uninflated position to an inflated position. The airbag inflatable by the inflation device is positioned to abut the windshield or side windows when in the inflated position.

DETAILED DESCRIPTION

Figure 1:
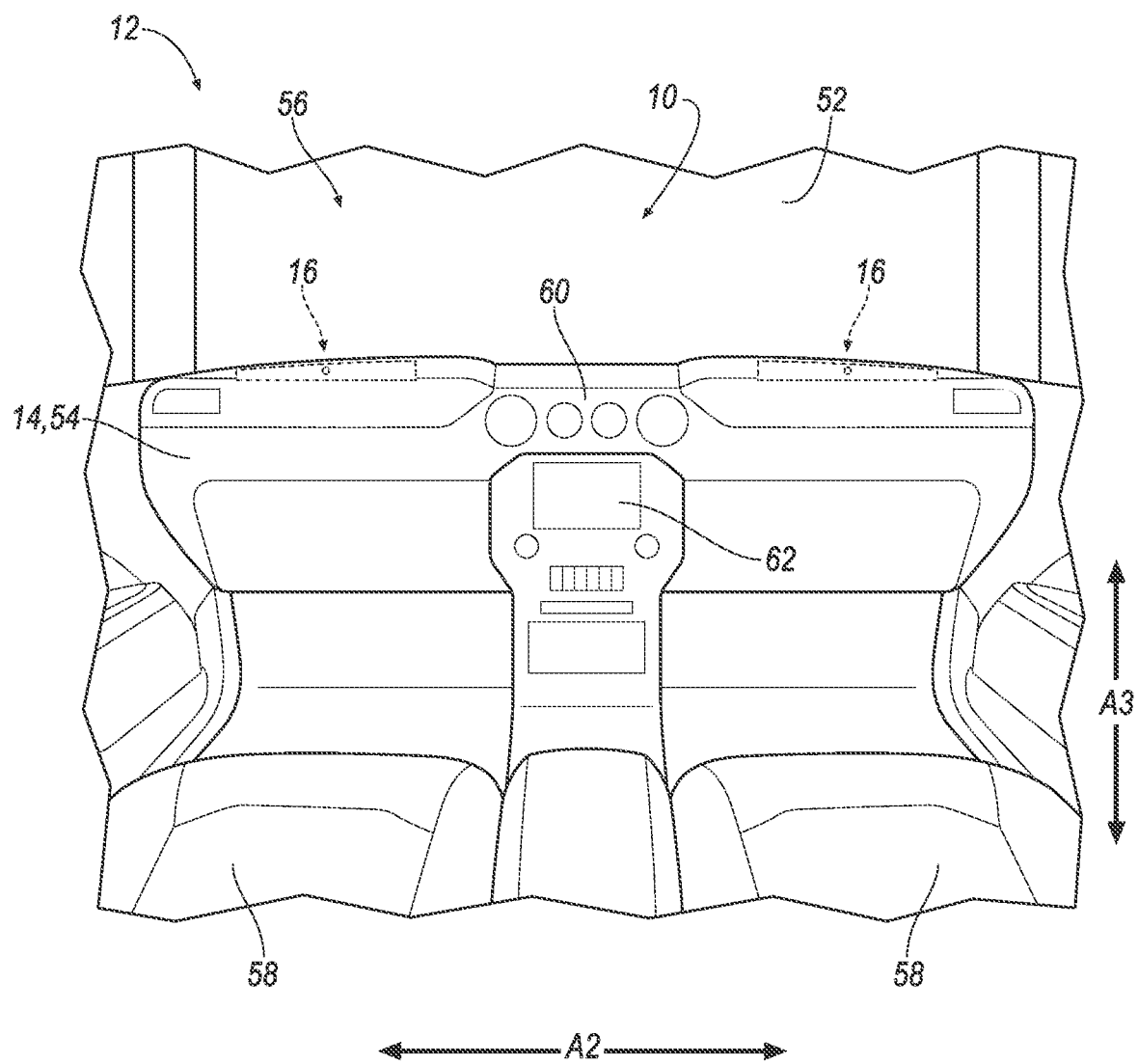
FIG. 1 is a front view of a passenger cabin of a vehicle.

An assembly includes an interior component. A deployable panel is supported by the interior component and has an upper panel and a lower panel. The deployable panel is movable relative to the interior component from a retracted position to an extended position. A hinge is between the upper panel and the lower panel. An airbag is inflatable to an inflated position in which the airbag is positioned to abut the upper panel in the extended position.

A spring may bias the deployable panel toward the extended position. The spring may be on the hinge. The spring may be positioned to bias the upper panel relative to the lower panel. The airbag may be positioned to load the spring in the inflated position. The spring may bias the upper panel toward a common plane with the lower panel.

The hinge includes a rod fixed to one of the upper panel and the lower panel. A ratchet-and-pawl mechanism may be engaged with the rod. A spring may be on the rod and positioned to bias the upper panel relative to the lower panel. The spring may be positioned to bias the upper panel in a first direction relative to the lower panel. The ratchet-and-pawl mechanism may allow rotation of the upper panel relative to the lower panel in a second direction opposite the first direction and may prevent rotation of the upper panel relative to the lower panel in the first direction.

An actuator may be releasably coupled to the deployable panel.

The upper panel and the hinge may be positioned to be above the interior component in the extended position.

A computer may include a processor and a memory storing instructions executable by the processor to move the deployable panel relative to the interior component and subsequently inflate the airbag.

The assembly deployable panel may be rigid relative to the airbag.

The deployable panel may include a reaction surface that is flexible relative to the airbag in the inflated position.

The interior component may be elongated in a cross-vehicle direction.

The interior component may be an instrument panel.

The deployable panel may be translatable between the retracted position and the extended position.

A track may be fixed to the interior component and slidably engage the deployable panel.

A spring may bias the deployable panel along the track toward the extended position.

The assembly may include a windshield. The deployable panel may be positioned to be between the airbag and the windshield in the extended position.

With reference to the Figures, wherein like numerals designate like parts throughout the several views, an assembly 10 for a vehicle 12 includes an interior component 14. The assembly 10 includes a deployable panel 16 supported by the interior component 14. The deployable panel 16 includes an upper panel 18 and a lower panel 20. The deployable panel 16 is movable relative to the interior component 14 between a retracted position and an extended position. The assembly 10 includes a hinge 30 between the upper panel 18 and the lower panel 20. The assembly 10 includes an airbag 24 inflatable to an inflated position in which the airbag 24 is positioned to abut the upper panel 18 in the extended position.

During a vehicle impact, the deployable panel 16 provides a reaction surface that abuts the airbag 24 when the airbag 24 is in the inflated position to position the airbag 24, e.g., relative to a vehicle occupant and/or the interior component 14. Specifically, during the vehicle impact, the airbag 24 is inflated to the inflated position and the deployable panel 16 is moved to the extended position. When the airbag 24 impacts the deployable panel 16, e.g., under the force of inflation and/or bias by the vehicle occupant toward the deployable panel 16, the upper panel 18 rotates about the hinge 30 relative to the lower panel 20, which at least partially controls the position of the airbag 24 and absorbs energy from the airbag 24.

The vehicle 12 may be any type of passenger or commercial automobile, such as a car, a truck, a sport utility vehicle, a crossover vehicle, a van, a minivan, a taxi, a bus, etc. The vehicle 12 defines a vehicle-longitudinal axis A1, e.g., extending between a front and a rear of the vehicle 12. The vehicle 12 defines a cross-vehicle axis A2, e.g., extending between a left side and a right side of the vehicle 12. The vehicle 12 defines a vehicle-vertical axis A3, e.g., extending between a top and a bottom of the vehicle 12. The vehicle-longitudinal axis A1, the cross-vehicle axis A2, and the vehicle-vertical axis A3 are perpendicular to each other. The top, bottom, front, rear, left and right sides, and relative directions used herein (such as forward, rearward, upward, downward, etc.) relative to a driving direction of the vehicle 12 when wheels of the vehicle 12 are all parallel with each other. A vehicle-forward direction and a vehicle-rearward direction extend along the vehicle-longitudinal axis A1 and a cross-vehicle direction extends along the cross-vehicle axis A2.

With reference to FIGS. 1-6, the vehicle 12 includes a passenger cabin 56 to house occupants, if any, within the vehicle 12. The passenger cabin 56 may house the assembly 10 and one or more seats 58. In other words, the interior component 14 may be in the passenger cabin 56.

The vehicle 12 includes one or more seat(s) 58. The seat 58 may be arranged in the passenger cabin 56 in any suitable position, i.e., as front seats, rear seats, third-row seats, etc. The seat 58 may be movable relative to a floor of the vehicle 12 to various positions, e.g., movable fore-and-aft and/or cross-vehicle. The seat assemblies may be of any suitable type, e.g., a bucket seat as shown in FIG. 1. Each seat 58 may rotate about a generally vertical axis that extends through a roof of the vehicle 12 and the floor of the vehicle 12 (i.e., generally parallel to the vehicle-vertical axis A3). For example, the seat 58 may rotate between a forward-facing position, a rearward-facing position, a rightward-facing position, a leftward-facing position, and/or positions therebetween. The seat 58 may rotate completely, i.e., 360°, about the vertical axis. The seat 58 may rotate between fixed positions, e.g., the forward-facing position and the rearward-facing position, or may be rotatable to an infinite number of positions.

The interior component 14 is positioned to be faced by the seat 58. As described below, the seats 58 may be fixed or may be rotatable about the generally vertical axis. In other words, the seats 58 may be fixed in a position facing the interior component 14 or may be rotated to a position facing the interior component 14.

The interior component 14 may be at a peripheral boundary of the passenger cabin 56 and face inwardly toward the passenger cabin 56. For example, the interior component 14 may be at a front of the passenger cabin 56, a rear of the passenger cabin 56, or sides of the passenger cabin 56. The interior component 14 may include other components, e.g., instruments described below, on exterior panels 66 of the interior component 14. As other examples, the exterior panels 66 may define the only portion of the interior component 14 that faces the passenger compartment. The exterior panels 66 may have a class-A surface, i.e., a finished surface exposed to view by a customer and free of unaesthetic blemishes and defects. The exterior panels 66 may be a polymer (e.g., vinyl), leather, etc.

As one example, the interior component 14 may be an instrument panel 54, as shown in FIGS. 1-6. The instrument panel 54 may be located at the front of the passenger cabin 56 (as shown in FIGS. 1-6) or the rear of the passenger cabin 56. In such examples, the interior component 14 may be elongated in the cross-vehicle direction. The instrument panel 54 may include one or more instruments such as vehicle controls 60 (e.g., a steering wheel, ride-sharing controls, navigational controls, lighting controls, etc.) and/or infotainment controls 62 (e.g., music selection controls, volume controls, map display and/or controls, etc.). The instruments may include a graphical-user interface, buttons, knobs, etc. As other examples, the interior component 14 may be a roof panel or a panel attached to or adjacent the seat 58. As another example, the interior component 14 may be a door trim panel on a door of the vehicle 12.

With continued reference to FIGS. 1-6, the vehicle 12 includes a windshield 52. The windshield 52 extends upwardly from the instrument panel 54. Specifically, the windshield 52 may extend from the instrument panel 54 to the roof. The instrument panel 54 may be spaced from the airbag 24 in the inflated position. The windshield 52 may extend generally vertically from the instrument panel 54 to the roof. The windshield 52 may be at the front of the passenger cabin 56. As another example, the windshield 52 may be at the rear of the passenger cabin 56. The windshield 52 is transparent. The windshield 52 may be any suitable transparent material, including glass such as laminated, tempered glass or plastic.

The assembly 10 includes an airbag assembly 22. The airbag assembly 22 is supported by the interior component 14. For example, the interior component 14 defines a cavity 64 that supports the airbag assembly 22. The airbag assembly 22 includes the airbag 24 and an inflator 26 and may include a housing 28. The airbag 24 is inflatable by the inflator 26 to the inflated position in which the airbag 24 is positioned to abut the upper panel 18 when in the extended position. The airbag assembly 22 is positioned to be a passenger airbag assembly. In the example shown in the Figures, the vehicle 12 may be an autonomous vehicle 12 without a steering wheel, and in such an example, the vehicle 12 may include two assemblies 10, i.e., on both sides of the instrument panel 54 in front of the seats 58 facing the interior component 14. In an example in which the vehicle 12 includes a steering wheel, the vehicle 12 may have one assembly 10 in front of a passenger seat 58, e.g., the right front seat 58. Alternatively, the vehicle 12 may have any suitable number of assemblies 10 in any suitable position.

Figure 4:
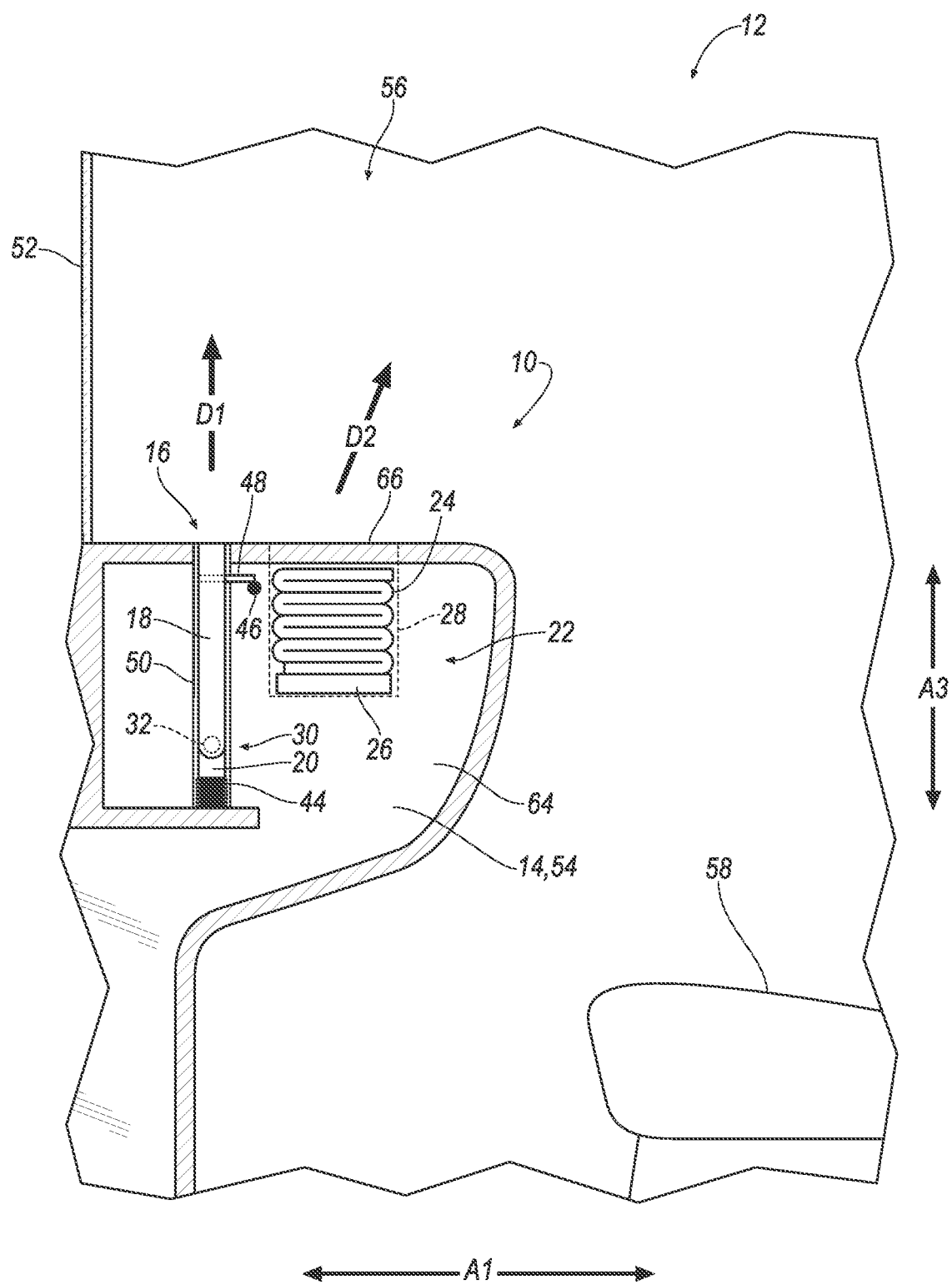
FIG. 4 is a cross-sectional view of an assembly with the deployable panel in a retracted position.
Figure 5:
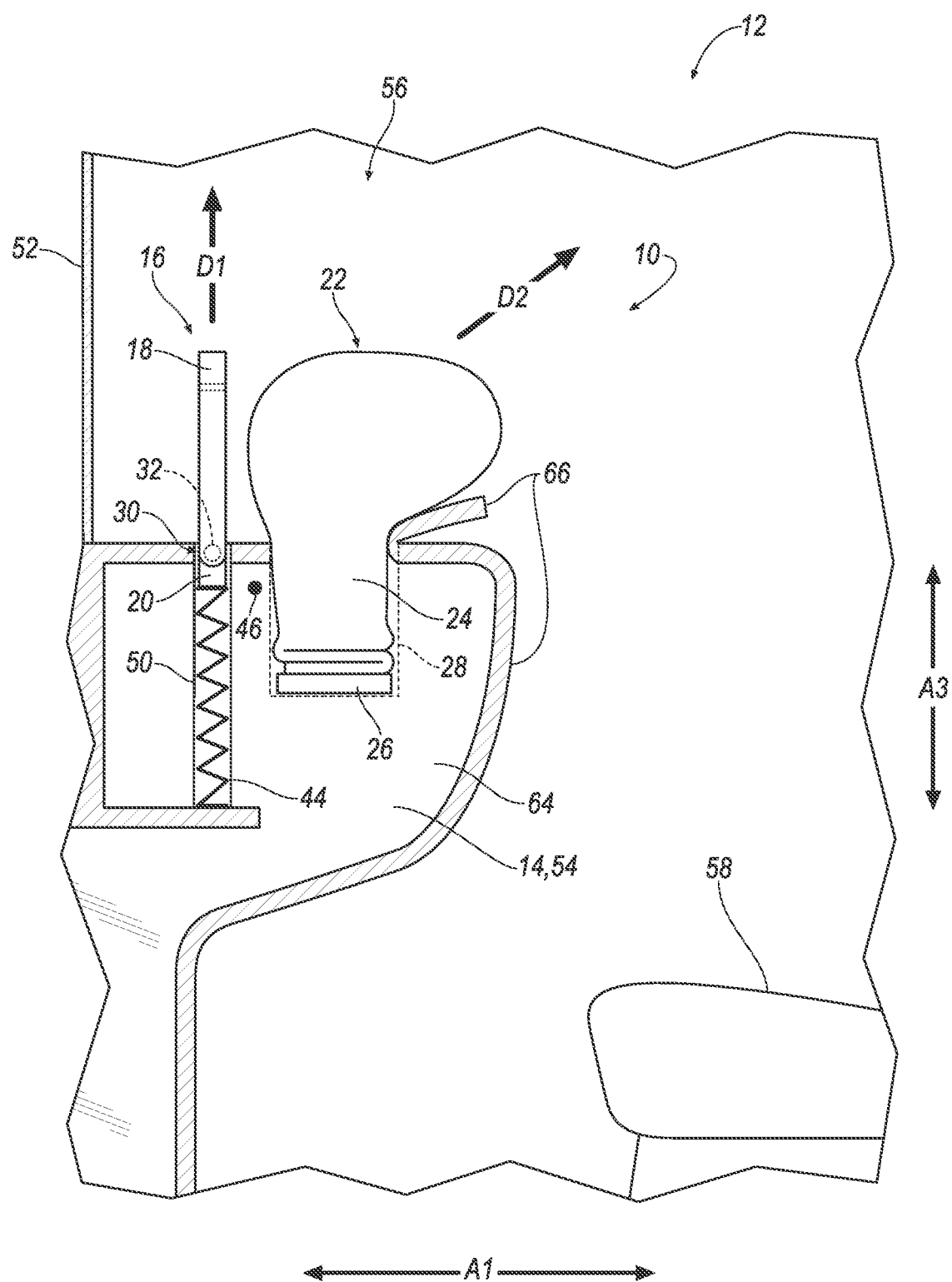
FIG. 5 is a cross-sectional view of the assembly with the deployable panel in the extended position and the airbag being inflated.
Figure 6:
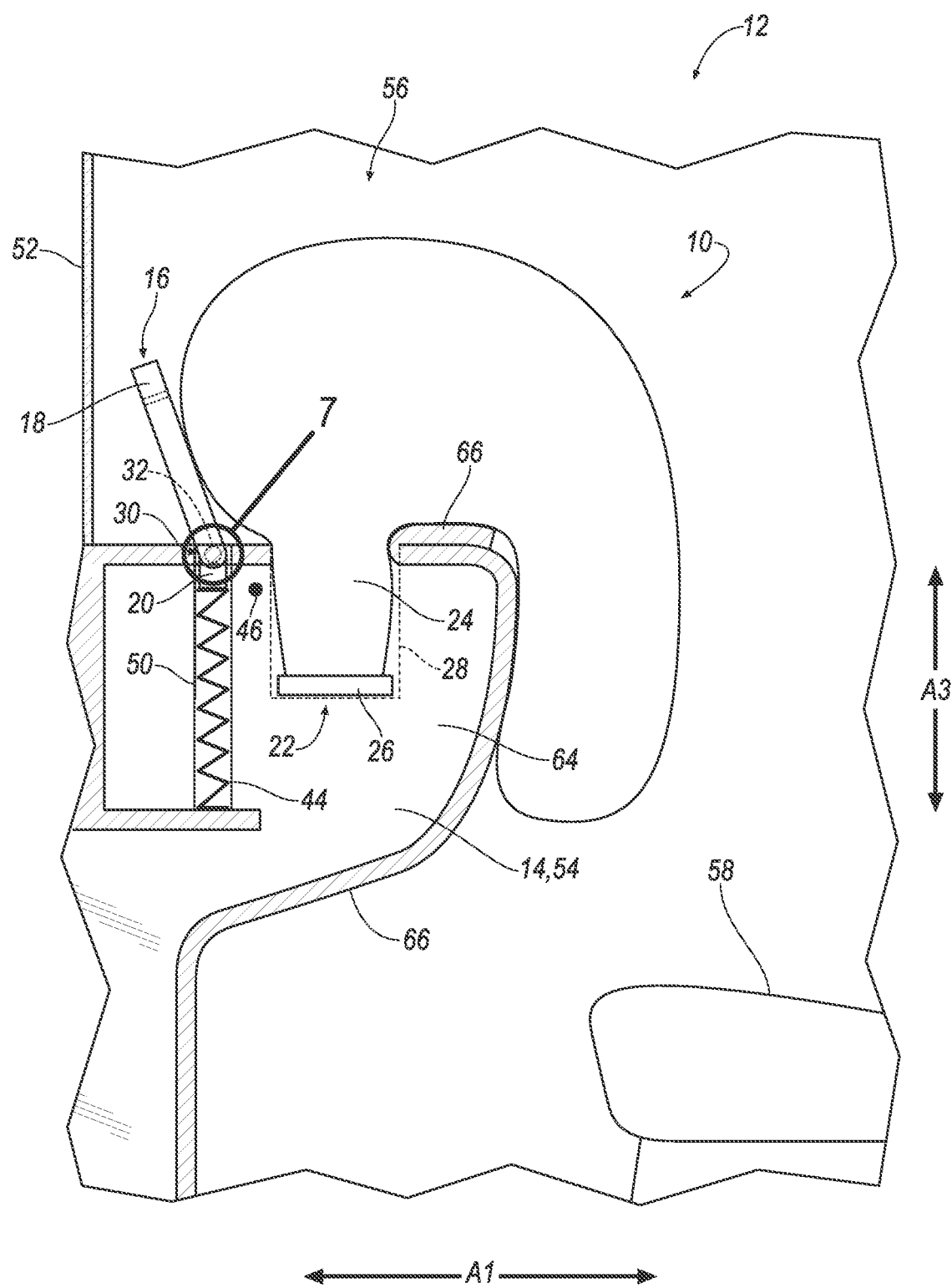
FIG. 6 is a cross-sectional view of the assembly with the deployable panel in the extended position and the airbag in the inflated position abutting the deployable panel.

The airbag 24 is mounted to the interior component 14, e.g., via the housing 28. The housing 28 houses the airbag 24 in the uninflated position, as shown in FIG. 4. The housing 28 supports the airbag 24 while being inflated, as shown in FIG. 5, and when the airbag 24 is in the inflated position, as shown in FIG. 6. The airbag 24 may be rolled and/or folded to fit within the housing 28 in the uninflated position. The housing 28 may be of any suitable material, e.g., a rigid polymer, a metal, a composite, or a combination of rigid materials. The housing 28 may be supported by the interior component 14.

The airbag 24 is positioned to abut the upper panel 18 when the airbag 24 is inflated to the inflated position and the upper panel 18 is in the extended position. In other words, the airbag 24 and the deployable panel 16 are positioned on the interior component 14 such that, when the airbag 24 is inflated to the inflated position and the deployable panel 16 is moved to the extended position, the airbag 24 abuts the upper panel 18. Specifically, the airbag 24 and the deployable panel 16 may be positioned on the interior component 14 such that the airbag 24 abuts the upper panel 18 even in the absence of the force of an occupant pushing the airbag 24 toward the upper panel 18.

The airbag 24 may be a woven polymer or any other material. As one example, the airbag 24 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The inflator 26 is in fluid communication with the airbag 24, e.g., via tubing or other structure to transfer inflation medium from the inflator 26 to the airbag 24. Upon receiving an instruction, such as an electrical pulse, from, e.g., a computer, the inflator 26 may inflate the airbag 24 with an inflatable medium, such as a gas, to the inflated position. The inflator 26 may be, for example, a pyrotechnic inflator that uses a chemical reaction to drive inflation medium to the airbag 24. The inflator 26 may be of any suitable type, for example, a cold-gas inflator. The inflator 26 may be supported by the housing 28 or at any other suitable vehicle location. The airbag 24 may tear, separate, or otherwise deform the exterior panel 66 of the interior component 14 (as shown in FIG. 6) as the airbag 24 inflates to the inflated position.

When the airbag 24 is in the uninflated position (as shown in FIG. 4) the airbag 24 is housed in the housing 28 and has not received any inflation medium from the inflator 26. The housing 28 is opened, deforming the exterior panel 66 of the interior component 14, shown in FIGS. 5 and 6, when the inflator 26 begins inflating the airbag 24 with inflation medium. The airbag 24 in the inflated position abuts the deployable panel 16 in the extended position, as shown in FIG. 6.

The deployable panel 16 is supported by the interior component 14. For example, the interior component 14 may include a frame that supports the deployable panel 16, e.g., concealed by the exterior panel 66. The deployable panel 16 may be positioned in the cavity 64 in the retracted position and extendable from the cavity 64 to the extended position. The deployable panel 16 may be elongated along the cross-vehicle axis A2.

Figure 2:
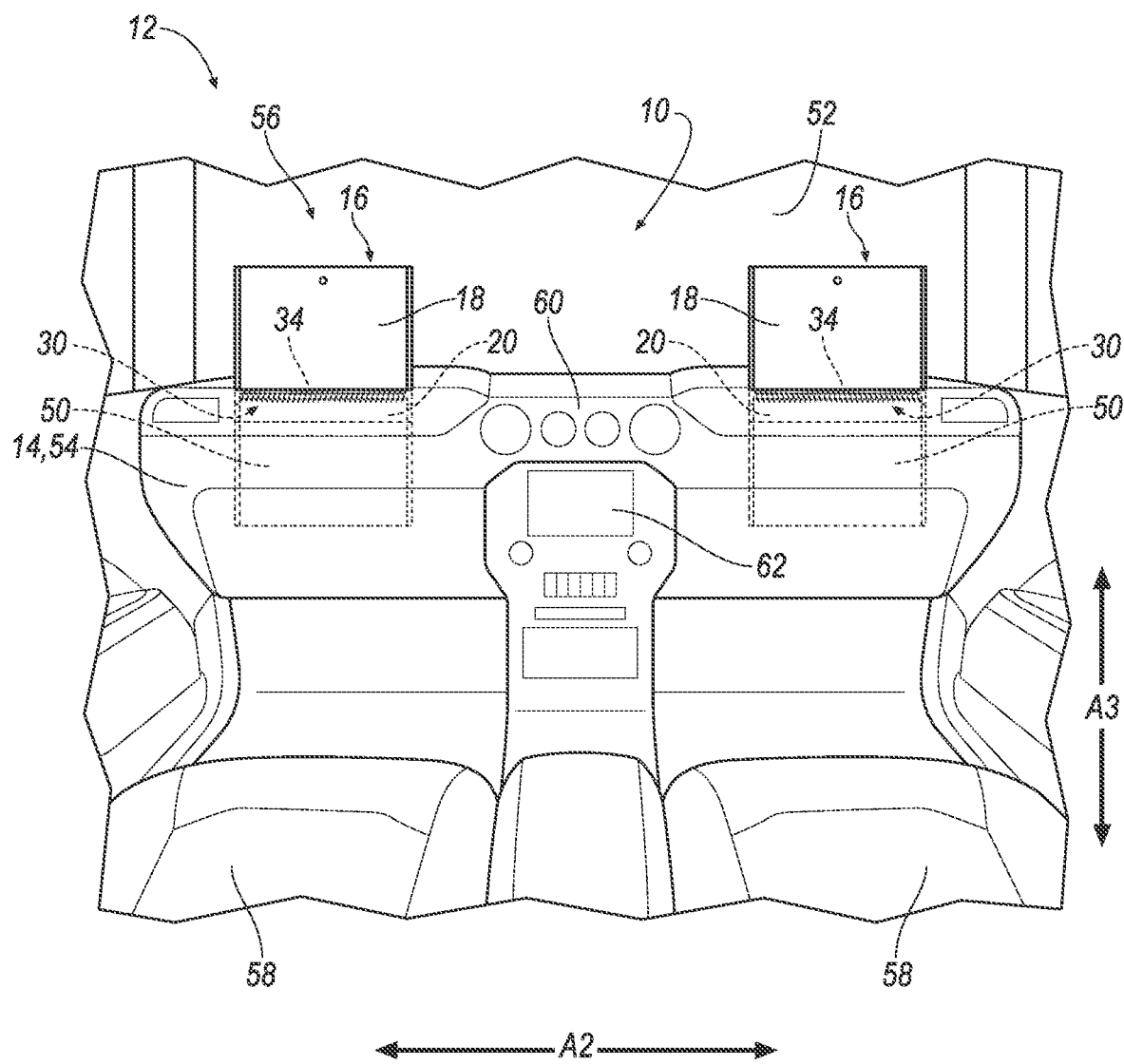
FIG. 2 is a front view of the passenger cabin with a deployable panel in an extended position.
Figure 3:
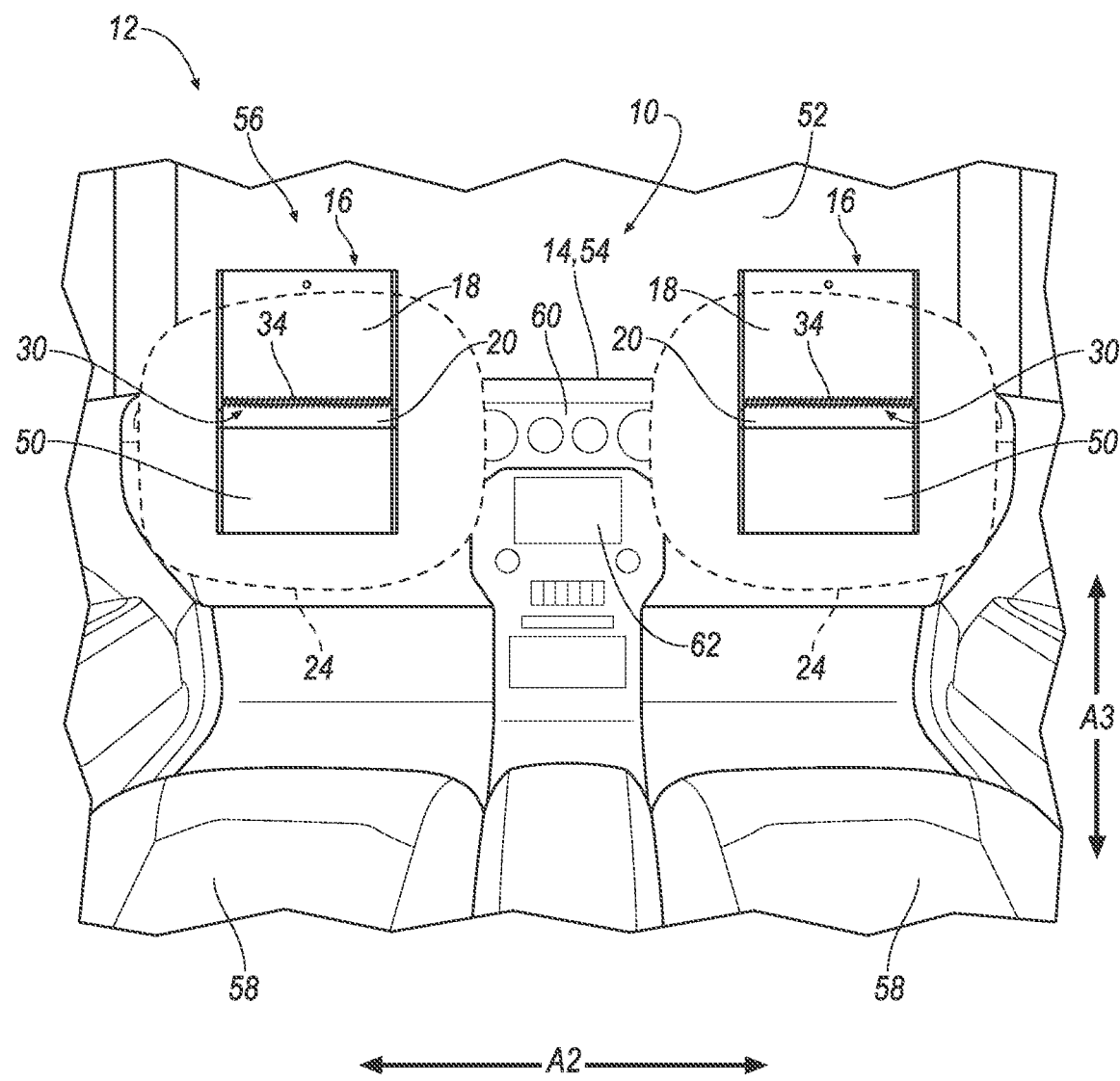
FIG. 3 is a front view of the passenger cabin with the deployable panel in the extended position and an airbag in an inflated position.

The deployable panel 16 is moveable relative to the interior component 14 between the retracted position, as shown in FIGS. 1 and 4, and the extended position, as shown in FIGS. 2 and 5. The deployable panel 16 may tear, separate, or otherwise deform the exterior panel 66 of the interior component 14 (as shown in FIG. 6) as the deployable panel 16 moves to the extended position.

The deployable panel 16 may be translatable between the retracted position and the extended position. "Translatable" means that the deployable panel 16 does not rotate when extending from the retracted position to the extended position prior to being abutted by the airbag 24. The deployable panel 16 may translate relative to the interior component 14. As described further below, the assembly 10 may include a track 50 that guides the translational movement of the deployable panel 16 relative to the interior component 14.

As an example, the deployable panel 16 is translatable to the extended position in a first direction D1, and the airbag 24 is inflatable to the inflated position in a second direction D2 that is transverse to the first direction D1. In other words, the direction D2 of the airbag 24 during deployment is different than the direction of the deployable panel 16 as the deployable panel 16 moves from the retracted position to the extended position. For example, the first direction D1 may be generally upward, and the second direction D2 may be generally vehicle-forward (e.g., under the force of inflation and/or bias by the vehicle occupant toward the deployable panel 16). For example, reaction forces between the airbag 24 and the deployable panel 16 may urge the airbag 24 to inflate transverse to the reaction surface.

The deployable panel 16 is rigid relative to the airbag 24. In other words, the deployable panel 16 deflects the airbag 24 when the airbag 24 impacts the deployable panel 16. The deployment panel resists movement of the airbag 24 and thus assists in positioning the airbag 24, e.g., relative to the interior component 14 and/or the occupant. The upper panel 18 and the lower panel 20, for example, may be plastic.

As set forth above, the deployable panel 16 has a reaction surface that is impacted by the airbag 24 when the deployable panel 16 is in the extended position and the airbag 24 is inflated. In other words, the reaction surface is the area of the deployable panel 16 that is impacted by the airbag 24.

The reaction surface may be flexible relative to the airbag 24. In other words, the reaction surface may flex when impacted by the airbag 24 in the inflated position. In such an example, the deployable panel 16 as a whole resists movement of the airbag 24, and the flex of the reaction surface absorbs energy from the airbag 24, e.g., in combination with the absorption of energy by a spring 34 on the hinge 30, as described below.

With reference to FIGS. 4-6, the hinge 30 is between the upper panel 18 and the lower panel 20. The hinge 30 allows the upper panel 18 to rotate relative to the lower panel 20. Specifically, the airbag 24 rotates the upper panel 18 relative to the lower panel 20 about the hinge 30 when the airbag 24 inflates to the inflated position and abuts the upper panel 18 (as shown in FIG. 6). The hinge 30 may be of any type, e.g., a butt hinge, plano hinge, butterfly hinge, living hinge, etc.

The upper panel 18 and the hinge 30 are positioned to be above the interior component 14 in the extended position. In other words, when the deployable panel 16 moves to the extended position, both the upper panel 18 and the hinge 30 are above the interior component 14, i.e., the hinge 30 is at or spaced from the exterior panel 66 of the interior component 14, so that the upper panel 18 is free to rotate when impacted by the airbag 24. The lower panel 20 remains at least partially in the interior component 14 when the deployable panel 16 is in the extended position, and the interior component 14 maintains the position of the lower panel 20 as the upper panel 18 rotates relative to the lower panel 20.

The hinge 30 may include a rod 32 about which at least one of the upper panel 18 and the lower panel 20 rotates. As one example, the rod 32 may be fixed to the upper panel 18, i.e., may rotate together with the upper panel 18, and may be rotatably engaged with the lower panel 20, i.e., rotatable relative to the lower panel 20.

The hinge 30 may be spring-loaded. Specifically, the assembly 10 may include a spring 34 on the hinge 30. The airbag 24 may be positioned to load the spring 34 in the inflated position. When the airbag 24, while inflating to the inflated position, impacts the upper panel 18, the airbag 24 loads the spring 34 and the spring 34 absorbs energy from the airbag 24, thus providing resistance to additional rotation of the upper panel 18 about the hinge 30.

The spring 34 is positioned to bias the upper panel 18 relative to the lower panel 20. For example, the spring 34 may be unloaded when the upper panel 18 and the lower panel 20 are coplanar during deployment of the deployable panel 16 to the extended position and may be loaded when the airbag 24 rotates the upper panel 18 relative to the lower panel 20. As another example, the spring 34 may be preloaded when the upper panel 18 and the lower panel 20 are coplanar during deployment of the deployable panel 16 to the extended position and may be further loaded when the airbag 24 rotates the upper panel 18 relative to the lower panel 20. The spring 34 may bias the upper panel 18 toward a common plane with the lower panel 20, i.e., to the position shown in FIG. 5. A ratchet-and-pawl mechanism 36, as described further below, may maintain the upper panel 18 and the lower panel 20 in the common plane when the deployable panel 16 moves to the extended position before the airbag 24 impacts the upper panel 18.

The spring 34 may be non-linear, i.e., having a resistance that is non-linear relative to displacement. In such an example, the spring 34 provides increased resistance as the airbag 24 continues to rotate the upper panel 18 about the hinge 30. The spring 34 may be, for example, a torsion spring. In such an example, the spring 34 may be on the rod 32 of the hinge 30.

Figure 7:
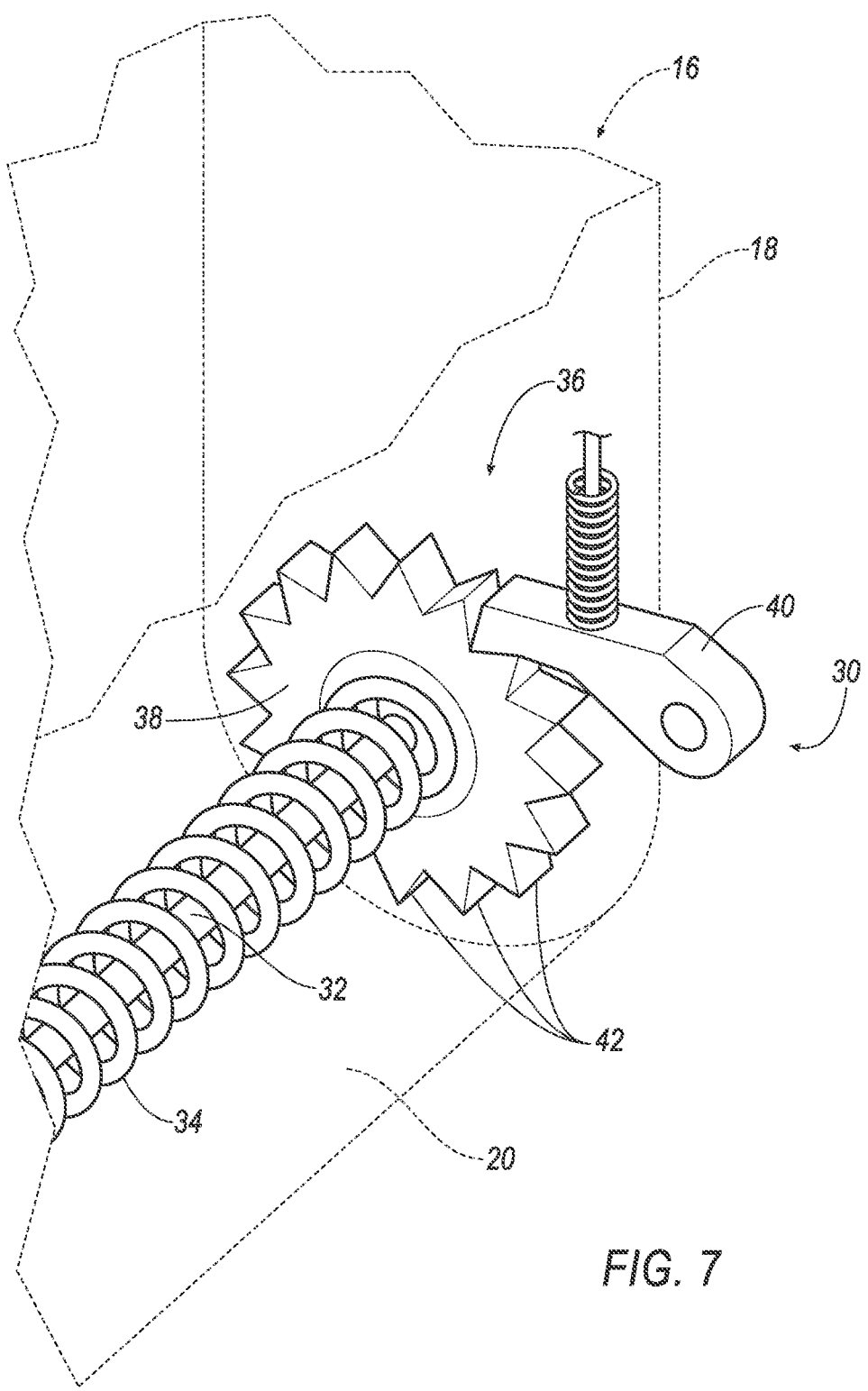
FIG. 7 is a cross-sectional view of the deployable panel with a hinge in the unloaded position.

With reference to FIG. 7, the hinge 30 may include the ratchet-and-pawl mechanism 36 to allow rotation of the upper panel 18 relative to the lower panel 20 in one direction and to prevent rotation of the upper panel 18 relative to the lower panel 20 in the opposite direction. Specifically, the spring 34 is positioned to bias the upper panel 18 in a first direction relative to the lower panel 20, and the ratchet-and-pawl mechanism 36 allows rotation of the upper panel 18 relative to the lower panel 20 in a second direction opposite the first direction and prevents rotation of the upper panel 18 relative to the lower panel 20 in the first direction. In the example shown in the Figures, the ratchet-and-pawl mechanism 36 allows the upper panel 18 to rotate relative to the lower panel 20 in a vehicle-forward direction (i.e., the second direction shown in the Figures), and prevents the upper panel 18 from rotating in a vehicle-rearward direction (i.e., the first direction shown in the Figures).

The ratchet-and-pawl mechanism 36 includes a ratchet wheel 38 and a spring-loaded pawl 40. The ratchet wheel 38 has teeth 42 and the spring-loaded pawl 40 is biased toward the teeth 42. The teeth 42 and the spring-loaded pawl 40 are designed to allow the ratchet wheel 38 to rotate relative to the spring-loaded pawl 40 in one direction (i.e., with the spring-loaded pawl 40 sliding over the teeth 42) and to prevent rotation of the ratchet wheel 38 relative to the spring-loaded pawl 40 in the opposite direction (i.e., with the spring-loaded pawl 40 locking against the teeth 42). The ratchet wheel 38 may be fixed to the rod 32. In such an example, as set forth above, the rod 32 may be fixed to the upper panel 18, in which case rotation of the upper panel 18 results in rotation of the ratchet wheel 38.

With reference to FIGS. 4-6, the assembly 10 includes a spring 44 biasing the deployable panel 16 toward the extended position. The spring 44 may be positioned between the interior component 14 and the deployable panel 16. The spring 44 may store mechanical energy when the deployable panel 16 is in the retracted position. The spring 44 is designed to release the mechanical energy and extend the deployable panel 16 toward the extended position when the deployable panel 16 is released from the interior component 14. The spring 44 may be, for example, a coil spring, a torsion spring, a compression spring, a V-spring, a gas spring, etc.

The assembly 10 may include an actuator 46 releasably coupled to the deployable panel 16. In other words, the actuator 46 retains the deployable panel 16 in the retracted position and releases the deployable panel 16 to allow the deployable panel 16 to move to the extended position. As one example, the actuator 46 retains the deployable panel 16 in the retracted position against the force of the spring 44 and, when the actuator 46 releases the deployable panel 16, the spring 44 unloads to move the deployable panel 16 to the extended position.

The actuator 46 may be releasably coupled to the upper panel 18, the lower panel 20, and/or the track 50 (as described below). The actuator 46 may be supported by the interior component 14. The actuator 46 may include a pin 48 that engages the deployable panel 16. The actuator 46 may be, for example, a pyrotechnic release that includes a pyrotechnic charge that detonates upon actuation, e.g., in response to an electrical pulse. Upon detonation, the pin 48 releases the deployable panel 16 from the interior component 14. Other examples of the actuator 46 may include a linear actuator, a solenoid actuator, a pneumatic actuator, a piezoelectric actuator, and/or another suitable actuator that releases the deployable panel 16 to be movable from the retracted position to the extended position.

The assembly 10 may include the track 50 fixed to the interior component 14 and slidably engaging the deployable panel 16. Specifically, the assembly 10 may include two tracks 50 on opposite sides of the deployable panel 16. The tracks 50 may each be positioned between the deployable panel 16 and the interior component 14. The tracks 50 may be supported by the interior component 14. The tracks 50 may be designed to permit translational movement of the deployable panel 16 relative to the interior component 14 and to restrict other movement (e.g., rotational) of the deployable panel 16 when extending from the retracted position to the extended position. The track 50 guides the deployable panel 16 to the extended position when the actuator 46 is detonated.

The spring 44 may bias the deployable panel 16 along the track 50 toward the extended position. Specifically, the assembly 10 may include two springs 44, i.e., one at each track 50. In one example, the actuator 46 is detonated, and the spring 44 biases the deployable panel 16 along the track 50 from the retracted position to the extended position. The track 50 may include a rail, roller, tongue and groove, etc.

In operation, upon detection of a vehicle impact, the actuator 46 is actuated to release the deployable panel 16 from the interior component 14. The springs 44 bias the deployable panel 16 to the extended position. The airbag 24 is inflated to the inflated position (e.g., after actuation of the actuator 46, as described further below) and the airbag 24 impacts the upper panel 18 (under the force of inflation and/or bias by the vehicle occupant toward the deployable panel 16). The impact of the airbag 24 biases the upper panel 18 in the second direction against the bias of the spring 34 in the first direction. The deployable panel 16 resists movement of the airbag 24 to position the airbag 24, and as the upper panel 18 rotates relative to the lower panel 20 and the spring 34 absorbs energy from the airbag 24. As the spring 34 continues to be loaded, the spring 34 reaches a loaded position that provides a resistance to the airbag 24 great enough to stop rotation of the upper panel 18 such that the upper panel 18 positions the airbag 24. The ratchet-and-pawl mechanism 36 prevents the upper panel 18 from rotating in the first direction.

In the example shown in the Figures, the interior component 14 is the instrument panel 54 and the deployable panel 16 is positioned between the windshield 52 and the airbag 24 when the airbag 24 is in the uninflated position and the deployable panel 16 is in the retracted position. The deployable panel 16 is positioned to be between the windshield 52 and the airbag 24 when the airbag 24 is in the inflated position and the deployable panel 16 is in the extended position, as shown in FIG. 6. The deployable panel 16 in the extended position is between the windshield 52 and the seat 58, e.g., positioning the airbag 24 in the inflated position closer to the seat 58 than if the windshield 52 functioned as a reaction surface for the airbag 24. As an example, this allows for the airbag 24 to be spaced from the windshield 52 in a position that does not use the windshield 52 as a reaction surface for the airbag 24. In such an example, this reduces design constraints on the vehicle-forward position of the windshield 52 and/or upward angle of the windshield 52.

Figure 8:
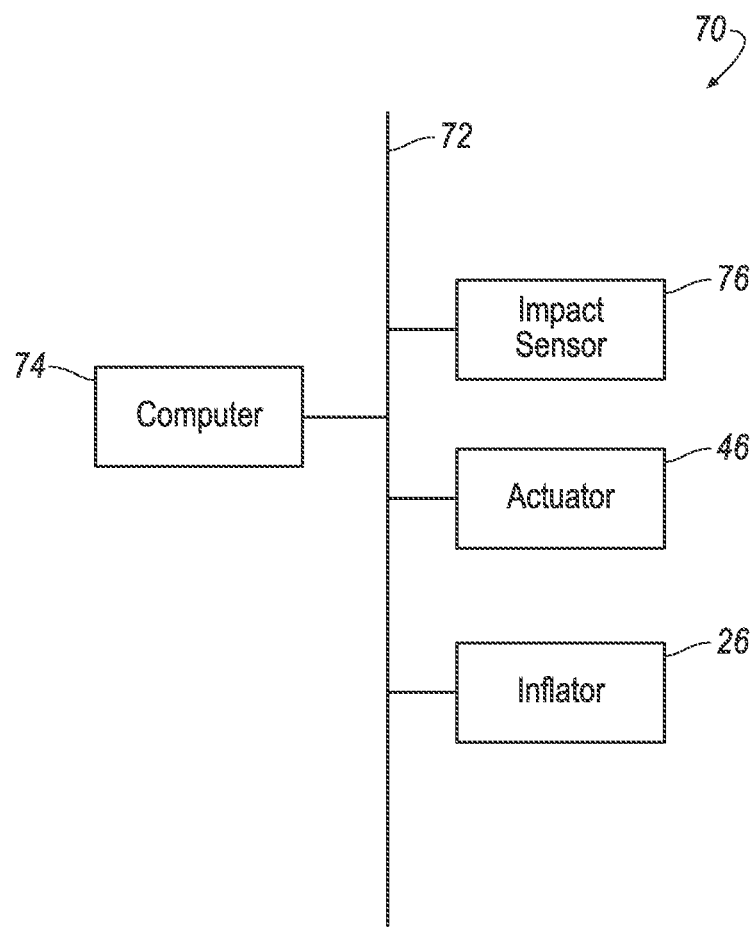
FIG. 8 is a block diagram of a control system for the vehicle.

With reference to FIG. 8, a control system 70 for the vehicle 12 may include a communications network 72, an impact sensor 76, a computer 74, the actuator 46, and the inflator 26. The control system 70 may transmit signals through the communications network 72, such as a controller area network (CAN) bus, Ethernet, Wi-Fi, local interconnect network (LIN), and/or by any other wired or wireless communications network. The computer 74 may be in communication with the impact sensor 76, the actuator 46, and the inflator 26 via the communications network 72.

The impact sensor 76 is adapted to detect an impact to the vehicle 12. The impact sensor 76 may be of any suitable type, for example, post-contact sensors such as linear or angular accelerometers, gyroscopes, pressure sensors, and contact switches; and pre-impact sensors such as radar, lidar, and vision-sensing systems. The vision-sensing systems may include one or more cameras, charge-coupled device (CCD) image sensors, complimentary metal-oxide-semiconductor (CMOS) image sensors, etc. The impact sensor 76 may be located at numerous points in or on the vehicle 12.

The computer 74 may be a microprocessor-based controller. The computer 74 may include a processor, memory, etc. The memory of the computer 74 may store instructions executable by the processor as well as data and/or databases. The computer 74 may be a restraint control module and may control the deployable panel 16, seat belts, etc., of the vehicle 12.

The computer 74 may be programmed to determine an impact to the vehicle 12. For example, the computer 74 may determine that a vehicle impact has occurred based on information received from the impact sensor 76 via the communications network 72.

The computer 74 may be programmed to move the deployable panel 16 relative to the interior component 14 and subsequently inflate the airbag 24. In other words, the computer 74 actuates the actuator 46 and subsequently actuates the inflator 26. Accordingly, the deployable panel 16 is in position to guide and position the airbag 24 before inflation of the airbag 24. The delay between actuating the actuator 46 and actuating the inflator 26 may be, for example, 10 ms. In other examples, the computer 74 may be programmed to actuate the actuator 46 and the inflator 26 simultaneously or to actuate the inflator 26 prior to actuating the actuator 46.

Specifically, the computer 74 may be programmed to actuate the actuator 46 in response to a vehicle impact. For example, the computer 74 may transmit an instruction via the communications network 72 to the actuator 46 to detonate the pyrotechnic charge.

The computer 74 may be programmed to actuate the inflator 26 in response to a vehicle impact. For example, the computer 74 may transmit an instruction via the communications network 72 to the inflator 26 to inflate the airbag 24 with inflatable medium to the inflated position.

Computing devices, such as the computer 74, generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

A computer-readable medium (also referred to as a processor-readable medium) includes any non-transitory (e.g., tangible) medium that participates in providing data (e.g., instructions) that may be read by a computer 74 (e.g., by a processor of a computer 74). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an engine control unit (ECU). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer 74 can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   an interior component;
   a deployable panel supported by the interior component and having an upper panel and a lower panel, the deployable panel being movable relative to the interior component from a retracted position to an extended position;
   a hinge between the upper panel and the lower panel; and
   an airbag inflatable to an inflated position in which the airbag is positioned to abut the upper panel in the extended position;
   the deployable panel being translatable relative to the interior component between the retracted position and the extended position.

2. The assembly of claim 1, further comprising a spring on the hinge, the spring positioned to bias the upper panel relative to the lower panel.

3. The assembly of claim 2, wherein the airbag is positioned to load the spring in the inflated position.

4. The assembly of claim 1, further comprising a spring on the hinge, the spring biasing the upper panel toward a common plane with the lower panel.

5. The assembly of claim 1, wherein the hinge includes a rod fixed to one of the upper panel and the lower panel, and further comprising a ratchet-and-pawl mechanism engaged with the rod.

6. The assembly of claim 5, further comprising a spring on the rod and positioned to bias the upper panel relative to the lower panel.

7. The assembly of claim 6, wherein the spring is positioned to bias the upper panel in a first direction relative to the lower panel, and the ratchet-and-pawl mechanism allows rotation of the upper panel relative to the lower panel in a second direction opposite the first direction and prevents rotation of the upper panel relative to the lower panel in the first direction.

8. The assembly of claim 1, further comprising an actuator releasably coupled to the deployable panel.

9. The assembly of claim 1, further comprising a spring biasing the deployable panel toward the extended position.

10. The assembly of claim 1, wherein the upper panel and the hinge are positioned to be above the interior component in the extended position.

11. The assembly of claim 1, further comprising a computer including a processor and a memory storing instructions executable by the processor to move the deployable panel relative to the interior component and subsequently inflate the airbag.

12. The assembly of claim 1, wherein the deployable panel is rigid relative to the airbag.

13. The assembly of claim 1, wherein the deployable panel includes a reaction surface that is flexible relative to the airbag in the inflated position.

14. The assembly of claim 1, wherein the interior component is an instrument panel.

15. The assembly of claim 1, further comprising a track fixed to the interior component and slidably engaging the deployable panel.

16. The assembly of claim 15, further comprising a spring biasing the deployable panel along the track toward the extended position.

17. The assembly of claim 1, further comprising a windshield, the deployable panel being positioned to be between the airbag and the windshield in the extended position.

18. The assembly of claim 1, wherein the upper panel is rotatable relative to the lower panel about the hinge when the deployable panel is in the extended position.

19. An assembly comprising:

an interior component;

a deployable panel supported by the interior component and having an upper panel and a lower panel, the deployable panel being movable relative to the interior component from a retracted position to an extended position;

a hinge between the upper panel and the lower panel;

an airbag inflatable to an inflated position in which the airbag is positioned to abut the upper panel in the extended position; and a spring on the hinge, the spring positioned to bias the upper panel relative to the lower panel; and the airbag is positioned to load the spring in the inflated position.

20. An assembly comprising:

an interior component;

a deployable panel supported by the interior component and having an upper panel and a lower panel, the deployable panel being movable relative to the interior component from a retracted position to an extended position;

a hinge between the upper panel and the lower panel; and an airbag inflatable to an inflated position in which the airbag is positioned to abut the upper panel in the extended position;

the hinge including a rod fixed to one of the upper panel and the lower panel; and a ratchet-and-pawl mechanism engaged with the rod.

* * * * *